April 27, 1937.  J. A. HANLEY  2,078,895
VIBRATORY ELECTRIC MOTOR
Filed Oct. 2, 1934
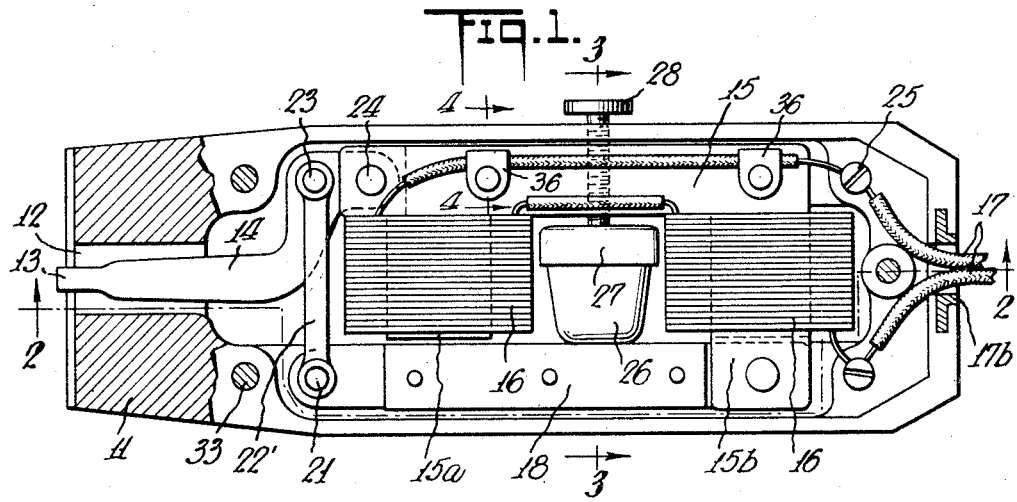
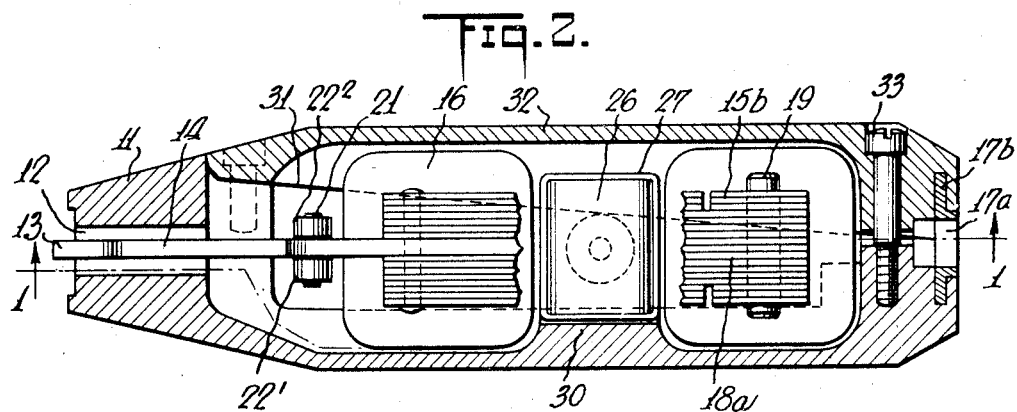
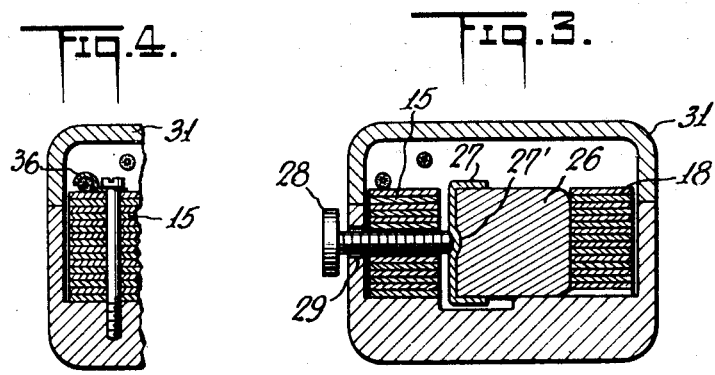
INVENTOR
John A. Hanley
BY
Dean, Fairbank, Hirsch & Foster
ATTORNEYS Patented Apr. 27, 1937

2,078,895

UNITED STATES PATENT OFFICE 2,078,895

VIBRATORY ELECTRIC MOTOR

John A. Hanley, Stamford, Conn., assignor, by mesne assignments, to Clipshave Inc., a corporation of New York Application October 2, 1934, Serial No. 746,500

6 Claims. (Cl. 172—126)

My present invention relates to improvements in electric motors and more particularly to improvements in motors of the vibratory type.

While various features of the invention are applicable to heavy duty motors, the present invention finds its preferred embodiment in a small, compact, light-weight, relatively light duty motor, consuming but a small amount of current, such for instance, as a motor weighing but a few ounces and adapted to be conveniently housed within the handle of a tool to be operated by the motor. The shaving device disclosed in my copending application, Serial No. 739,432, filed August 11, 1934, is one example of the type of tool which may be efficiently operated by my improved motor.

Vibratory motors have a great deal of power available at the armature within a relatively small amplitude of movement of the latter, and as a feature of this invention I propose to mechanically amplify the movement of the armature within its most effective small and powerful range so that the full power of the armature may be delivered at a relatively remote point and at the same time the range of movement available at the end of its power take-off train is considerably greater than the range of movement within which the armature itself delivers power efficiently. With such an arrangement, the armature itself need have but a small amplitude of movement. This is in direct contradistinction to vibratory motors which utilize armature extensions as work arms or apply power from the armature without any intermediate motion or power multiplying mechanism.

Another feature of the invention is the conversion of the normally accelerating stroke of the armature into a steady uniform movement at the end of the work arm. This is preferably effected by interposing, in the path of movement of the armature toward the field, a compressible element so designed that its opposition to armature movement under the influence of the field increases substantially proportionately as the magnetic attraction of the field for the armature increases, the latter of course increasing inversely as the square of the distance between the armature and the field. Thus the movement of the tool which is actuated from the end of the work arm is relatively steady and at a substantially uniform speed as distinguished from the jerky motion imparted to tools operated directly from an armature.

The motor is ideally suited for oscillating a work arm and thereby driving the reciprocatory element of various standard types of electrical shaving devices or other small tools since it may be conveniently encased in a relatively small elongated handle casing with the work arm projecting through an end of the casing to drive the movable cutter element or other working part of the tool. Furthermore, the motor may be readily manufactured as a small compact unit, adapted for convenient and secure encasement in a hollow handle member. It may be readily repaired, it is rugged, durable and efficient in use and it is particularly well suited to meet the requirements of economical manufacture.

The invention may be more fully understood from the following description in connection with the accompanying drawing, wherein:—

Fig. 1 is a sectional view through a motor casing with one section of the casing removed and showing my improved motor mounted in the casing, this view being taken approximately on the staggered line 1—1 of Fig. 2, Fig. 2 is a view taken approximately on the staggered line 2—2 of Fig. 1, and at right angles to the latter figure, with part of the armature broken away to expose the compression member, Fig. 3 is a transverse sectional view taken on line 3—3 of Fig. 1, and, Fig. 4 is a detail sectional view on line 4—4 of Fig. 1.

In the drawing, there is shown a relatively elongated hollow sectional casing member of generally rectangular cross section. The casing at one end tapers as indicated at 11 and has an opening 12 in its tapered end through which projects the tool engaging end 13 of a work arm 14, pivotally mounted at its opposite end 24 and constituting part of my improved motor. This work arm is adapted to engage a cutter or any other suitable tool (not shown) mounted on the end of the casing and imparts a reciprocating or oscillating movement thereto.

My improved motor includes a soft iron field 15 of generally U-shape. The two pole-forming legs 15a, 15b, of the field are encircled by suitable windings 16 connected by lead wires 17 (which pass out through an openings 17a lined by a rubber bushing 17b in the casing and are secured within the casing by binding screws 25) to any suitable source of alternating current. The pole-forming leg 15b of the field has its outer laminations 15b protruding beyond the intermediate ones, to straddle one end 18a of armature 18 which is pivotally connected in place by any suitable means, such as pivot pin 19 tightly fitted at its ends in leg ends 15b.

The field 15 as well as the armature 18 are made up each of a plurality of laminations of what is known in shop parlance as electrical iron, with high magnetic permeability and low retentivity.

The free end of the armature 18 is pivotally connected by pin 21 to one end of each of a pair of links 22' and 22², the other ends of said links straddling and being pivotally connected by pin 23 to the work lever or work arm 14.

The pole forming legs of the field are spaced sufficiently far apart and their windings are sufficiently far apart to provide room between them for a member 26 which yieldably opposes movement of the free end of the armature toward the pole 15a of the field when the field is energized.

Member 26 may consist of a rubber block, which is tightly fitted at one end with a metal cup 27. Adjustment of rubber block 26 is effected by screw 28 through hole 29 in the casing and threaded through field 15, the point of the screw being lodged in depressions 27' of cup 27. That end of the compressible block 26 which is engaged by the armature as the latter is attracted by the field, is of tapered conformation so that as the armature moves toward the attracting pole the resistance of the block to further compression will increase. This block is preferably so set that the armature never quite touches pole piece 15a, which avoids both noise and wear.

The casing preferably has an oblique upper wall 31 for facility of access to its contents, and for adequate strength of the complementary insulating cover 32, which is held closed by appropriate screws 33. It is noted that opening 17a is formed of complementary notches in the ends of the casing and of the cover.

Preferably, the casing has a plurality of bosses 30 molded integrally therewith which serve to position the motor, and the latter is firmly secured in place by screws one of which appears in Fig. 4 traversing the field 15 and threaded into the casing, the head of said screw securing metal clip 36, which holds conductor 37, which in turn is connected to binding screw 25.

The extent to which the armature may move away from the pole 15a when it is repelled thereby will in most cases be limited by some mechanical limiting means (not shown) for the stroke of the motor operated tool. In any event the amplitude of movement of the armature is relatively slight, whereas the amplitude of movement of the lever end 13 is relatively great due to mechanical amplification afforded by the lever train consisting of armature 18, links 22 and lever 14. Of course, the closer the pivot 23 is to the mounting pivot 24, the greater will be the amplitude of movement of the free end of lever 14.

An important feature is that the armature has a very slight amplitude of movement and in all positions within this range of movement is subject to an intense magnetic field and is consequently very powerfully acted upon by the field. Throughout its entire movement, as the result, adequate power is available at the end of the lever 14. It will be apparent that if this lever were connected directly to the armature, a greater amplitude of movement of the armature would be necessary to effect the same amplitude of movement at the end of lever 14, with a resultant loss of power at the end of the work lever during at least part of the armature stroke.

By reason of the fact that the armature throughout its movement remains close to the field, it is at all times in the region of high flux, so that a motor small in weight and bulk readily accommodated in a small casing can be used, and in addition, the heat evolution due to the small current consumption is lower and the device remains cool at all times. With a motor of the construction set forth, the power consumption need be but in the order of 10 watts or less.

It will further be apparent that while the link connection which is arranged closer to the pivot 24 than the free end thereof is not a power multiplying connection per se, it does permit the use of a relatively shorter work arm and effects a resultant better leverage than if the armature itself were the only lever involved.

The operation of the device will be substantially self-evident from the foregoing description. It may be briefly recapitulated as follows:—

The lead wires 17 from the motor may be plugged in to any suitable socket to establish a flow of alternating current through the field windings. At each reversal of cycle the free end of the armature will be either attracted to or repelled from the pole 15a. The rapidly oscillating armature has but a small amplitude of movement, that is to say, it is always sufficiently close to the field so that it is strongly influenced by the magnetic flux. This small armature motion is multiplied to effect a powerful and greater movement at the free end 13 of the work arm or lever 14.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A vibratory electric motor including a field having a pair of pole forming legs, an armature pivotally connected to the end of one leg and having a free end movable toward and away from the end of the other leg, a work lever pivoted at one end on the field and having a free end adapted to engage a device to be operated by the motor and a power transmitting, motion translating connection between the free end of the armature and the lever.

2. A vibratory electric motor including a field having a pair of pole forming legs, an armature pivotally connected to the end of one leg and having a free end movable toward and away from the end of the other leg, a work lever pivoted at one end on the field and having a free end adapted to engage a device to be operated by the motor and a power transmitting, motion translating connection between the free end of the armature and the lever, said connection including a link pivoted at one end to the end of the armature and at its other end to the lever adjacent the fulcrum thereof.

3. A vibratory electric motor including a U-shaped field having a pair of pole forming legs, an armature pivotally connected to the end of one leg and having a free end movable toward and away from the end of the other leg, and a tapered compressible rubber block between the legs of said field and opposing with progressively increasing force, movement of the armature toward the field.

4. A vibratory electric motor including a U-shaped field having a pair of pole forming legs, an armature pivotally connected to the end of one leg and having a free end movable toward and away from the end of the other leg, a tapered compressible rubber block between the legs of said field and opposing with progressively increasing force, movement of the armature toward the field, and means for adjusting the block to predetermine the limit of movement of the armature toward the field.

5. A vibratory electric motor including a field having a pair of pole forming legs, an armature pivotally connected to the end of one leg and having a free end movable toward and away from the end of the other leg, said armature having a relatively small amplitude of movement, a lever pivotally connected to that side of the field most remote from the armature and a link pivotally connecting the free end of the armature and the lever whereby the free end of the lever has a greater amplitude of movement than the free end of the armature.

6. The combination with a hollow tool handle having an opening in one end thereof, of an elongated vibratory electric motor housed within the handle, said motor including an elongated field and field windings, a pivoted armature, a lever pivoted on the field and projecting through the opening and adapted for engagement with a tool mounted in the end of the handle, and means connecting the armature and the lever to convert a relatively small amplitude of movement of the armature into a greater amplitude of movement at the free end of the lever.

JOHN A. HANLEY.